(12) United States Patent
Fleckenstein

(10) Patent No.: US 6,402,193 B1
(45) Date of Patent: Jun. 11, 2002

(54) STEERING WHEEL WITH AIRBAG MODULE AND HORN CONTRACT

(75) Inventor: Jupp Fleckenstein, Bessenbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/545,318

(22) Filed: Apr. 7, 2000

(30) Foreign Application Priority Data

Apr. 9, 1999 (DE) .......................................... 299 06 374

(51) Int. Cl.$^7$ .............................................. B60R 12/16
(52) U.S. Cl. .................. 280/731; 280/728.2; 200/61.55
(58) Field of Search ............................. 280/728.2, 731; 200/61.54, 61.55

(56) References Cited

U.S. PATENT DOCUMENTS

| | | | | |
|---|---|---|---|---|
| 4,785,144 A | * | 11/1988 | Fosnaugh et al. | 200/61.55 |
| 4,789,763 A | * | 12/1988 | Nagata et al. | 200/61.54 |
| 5,023,412 A | * | 6/1991 | Ishida et al. | 200/61.54 |
| 5,036,169 A | * | 7/1991 | Sakane | 200/61.54 |
| 5,239,147 A | * | 8/1993 | Allard et al. | 200/61.54 |
| 5,303,952 A | * | 4/1994 | Shermetaro et al. | 280/731 |
| 5,327,796 A | * | 7/1994 | Ernst et al. | 74/484 H |
| 5,508,481 A | * | 4/1996 | Williams et al. | 200/61.54 |
| 5,508,482 A | * | 4/1996 | Martin et al. | 200/61.55 |
| 5,584,501 A | * | 12/1996 | Walters | 280/728.2 |
| 5,593,178 A | * | 1/1997 | Shiga et al. | 280/728.2 |
| 5,597,177 A | * | 1/1997 | Matsuura | 280/731 |
| 5,738,369 A | * | 4/1998 | Durrani | 280/731 |
| 5,775,725 A | * | 7/1998 | Hodac et al. | 280/728.2 |
| 5,927,746 A | * | 7/1999 | Komiya et al. | 280/728.2 |
| 5,931,492 A | * | 8/1999 | Mueller et al. | 280/728.2 |
| 5,950,494 A | * | 9/1999 | Sugiyama | 74/484 H |
| 6,036,223 A | * | 3/2000 | Worrell et al. | 280/731 |
| 6,062,592 A | * | 5/2000 | Sakurai et al. | 280/728.2 |
| 6,079,737 A | * | 6/2000 | Isomura et al. | 280/731 |

FOREIGN PATENT DOCUMENTS

| | | |
|---|---|---|
| DE | 4117303 | 1/1992 |
| DE | 4140275 | 6/1992 |
| DE | 19801514 | 10/1998 |
| DE | 69504264 | 3/1999 |
| EP | 0786393 | 1/1997 |
| JP | 08318806 | 12/1996 |

* cited by examiner

Primary Examiner—Eric Culbreth
Assistant Examiner—L. Luk
(74) Attorney, Agent, or Firm—Tarolli, Sundheim, Covell, Tummino & Szabo L.L.P.

(57) ABSTRACT

The invention relates to a steering wheel, in particular for use in motor vehicles. The steering wheel comprises a steering wheel plane, an airbag module, a support plate and a spring plate connected to the support plate via an electrically insulating element. The steering wheel further comprises an insulating support fixed to the steering wheel, and restoring springs for replacing the airbag module in an initial position after displacement for actuation of a horn contact. The airbag module, for actuation of the horn contact, is constructed so as to be displaceable approximately perpendicularly to the steering wheel plane against the restoring springs by at least a contact gap. The airbag module is connected with the support plate extending substantially parallel to the steering wheel plane, the support plate being connected electrically to the vehicle, forming an earth contact and cooperating with the spring plate defining a counter-contact arranged so as to be electrically insulated with respect to the vehicle. The spring plate is aligned substantially parallel to the steering wheel plane and has at least one contact arm which is able to be deflected elastically, approximately perpendicularly to the support plate and is able to be supported on a rear face on the insulating support.

14 Claims, 2 Drawing Sheets

STEERING WHEEL WITH AIRBAG MODULE AND HORN CONTRACT

TECHNICAL FIELD

The invention relates to a steering wheel with an airbag module.

BACKGROUND OF THE INVENTION

In steering wheels equipped with airbag modules, the airbag module is generally equipped on the driver side with a covering cap which is adapted visually and haptically to the installation environment, which cap at the same time forms the push-button region for actuation of the horn contact. This covering cap must be able to be easily torn open and swung open so that the gas bag arranged folded together therebeneath can emerge unimpeded and can unfold when it is inflated in an explosion-like manner as a function of a defined threshold deceleration of the vehicle. For these reasons, the covering cap must be constructed so as to be as low in mass as possible. It further follows from this that it can not be designed to be arbitrarily thick and rigid.

If, to actuate the horn contact, only the covering cap is to be arranged so as to be movable relative to the steering wheel, the problem arises that the covering cap can not be supported directly on the gas bag lying therebeneath, because otherwise the horn actuation would be hindered. On the other hand, with a covering cap only supported on the marginal side, the danger exists that the provided tearing and bending regions become weakened over time and partially break open, so that the gas bag space is no longer sealed to the exterior.

With regard to the above-mentioned difficulties, one therefore generally proceeds so that not only is the covering cap but the entire airbag module arranged movably relative to the steering wheel body so far that the horn contact can be actuated and released again. With such designs, usually there is one of the two contacts arranged fixed in position in the steering wheel body and the other contact fastened to the movable airbag module. In so doing, however, the difficulty arises that on installation of the airbag module in the steering wheel, one must take precise care to maintain the contact gap, because otherwise either no horn contact comes about or else the horn signal is triggered unintentionally by vehicle vibrations owing to too small a contact gap. The known design therefore not only requires a careful installation, but also the maintaining of close manufacturing tolerances in the production and assembly of all the components involved, which is time-consuming and costly.

BRIEF SUMMARY OF THE INVENTION

The invention is based on the problem of constructing the horn contact for a steering wheel so that the manufacturing expenditure can be reduced without the reliability of operation being impaired. This is achieved in a steering wheel which comprises a steering wheel plane, an airbag module, a support plate and a spring plate connected to the support plate via an electrically insulating element. The steering wheel further comprises an insulating support fixed to the steering wheel, and restoring springs for replacing the airbag module in an initial position after displacement for actuation of a horn contact. The airbag module, for actuation of the horn contact, is constructed so as to be displaceable approximately perpendicularly to the steering wheel plane against the restoring springs by at least a contact gap. The airbag module is connected with the support plate extending substantially parallel to the steering wheel plane, the support plate being connected electrically to the vehicle, forming an earth contact and cooperating with the spring plate defining a counter-contact arranged so as to be electrically insulated with respect to the vehicle. The spring plate is aligned substantially parallel to the steering wheel plane and has at least one contact arm which is able to be deflected elastically approximately perpendicularly to the support plate and is able to be supported on a rear face on the insulating support.

The basic idea consists in arranging both contacts on the airbag module which is movably arranged with respect to the steering wheel and of providing in the steering wheel itself only an electrically insulating support, on which a contact arm, able to be deflected elastically, can rest on the rear face, so that in the case of pressure onto the covering cap and relative movement between airbag module and steering wheel it can be deflected and can be brought into electrically conducting connection with the support plate which is constructed as an earth contact.

In this way, a very precise installation gap can be maintained by simple means between the support plate and the contact arm. Except for the support arranged in the steering wheel, all the components which are involved are arranged on the airbag module, so that the installation contact gap is not impaired by the incorporation of the airbag module into the steering wheel. Care must merely be taken that the support, for the contact arm, on the steering wheel side is correctly positioned relative to the installation plane for the airbag module. Since, moreover, the play for the movement of the airbag module relative to the steering wheel body must always be distinctly greater than the gap for the horn contact, one can provide relatively large tolerances with respect to the arrangement of the support relative to the installation plane, because the contact arm does not compulsorily have to rest directly on the support as long as no actuation of the horn contact is desired. A certain "idle stroke" up to the supporting of the contact arm on the support can be readily accepted, the relative movement between airbag module and steering wheel body being greater by the "idle stroke" than the minimum contact gap which is to be maintained.

DETAILED DESCRIPTION OF THE PREFERRED EMBODIMENTS

Figure 1:
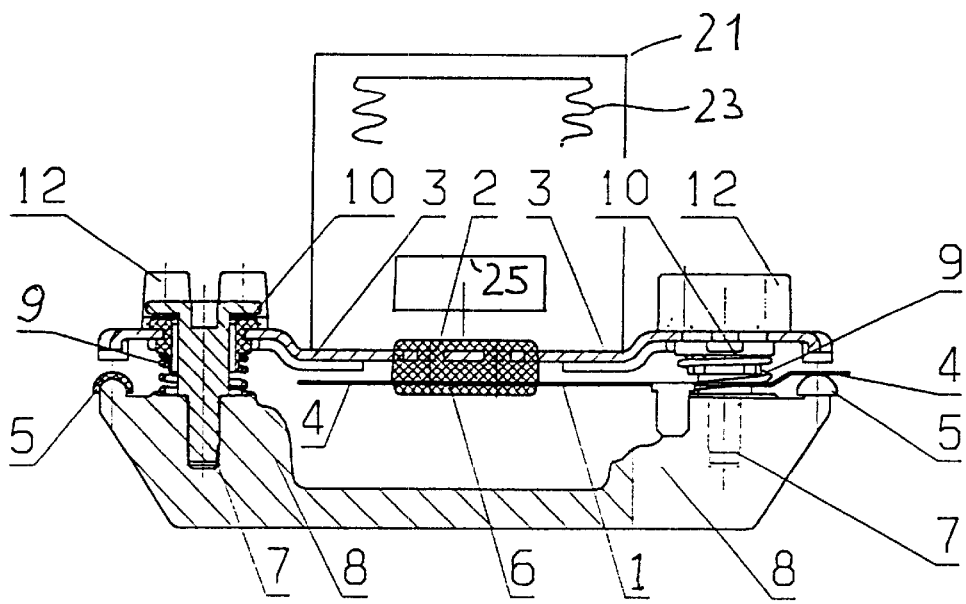
FIG. 1 shows a vertical partial section through a steering wheel with the components relevant to the invention.

In the embodiment according to FIG. 1, a support plate 3 is connected by means of screws 7 having a shaft (preferably a close-tolerance bolt) with the skeleton of the steering wheel such that, on pressure applied from above contrary to the restoring force of the spring 9, it can be moved towards the steering wheel 8. In this respect, the illustration corresponds to the known arrangement of a support plate for the fastening of an airbag module 21, containing a gas bag 23 and an inflator 25, which module is to be arranged so as to be movable relative to the steering wheel for actuation of a horn contact. According to the invention, the counter-contact in the form of a spring plate 1 is also connected with the support plate 3 for the airbag module and, thus, arranged so as to be movable relative to the steering wheel 8. Thus, the spring plate 1 is—apart from the electrical connection-attached only at the side of the module, i.e. there is no further attachment site at the side of the steering wheel. To fasten the spring plate 1, an electrically insulating element 2 is provided, which preferably consists of an injection-molded plastic part. The injection-molded plastic part 2 embraces the central part 6 of the spring plate 1 and a marginal region of the support plate 3, optionally bores being provided in the support plate 3 to improve the stability, which bores are filled out by the injection-molded plastic part 2. In the embodiment illustrated, the spring plate 1 is provided with two contact arms 4 originating from the central part 6 and able to be deflected elastically, the ends of which contact arms 4 are able to be supported on the rear face on an insulating support 5 fixed to the steering wheel. If the support plate 3 is pressed downwards against the force of the restoring springs 9 for actuation of the horn contact, then the contact arms 4 are deflected elastically upwards from the position illustrated in FIG. 1, until they touch the end of the support plate 3 and thereby produce the desired electrical contact, without the need of providing an additional mechanical transfer element. If the actuating pressure onto the support plate 3 is taken away, then the support plate 3 is shifted upwards again by the restoring springs 9, so that also the contact arms, which are able to be deflected elastically, and the airbag module can move back into the illustrated initial position. For the insertion of the screws 7, bores or recesses 13 (see FIG. 2) are provided in the support plate 3, which are lined with a bush 10 in the form of an injection-molded plastic part. On each of the bushes 10 for the screws 7 there is integrally formed, preferably with an offset, a support or spacer 12 for the airbag module.

Figure 2:
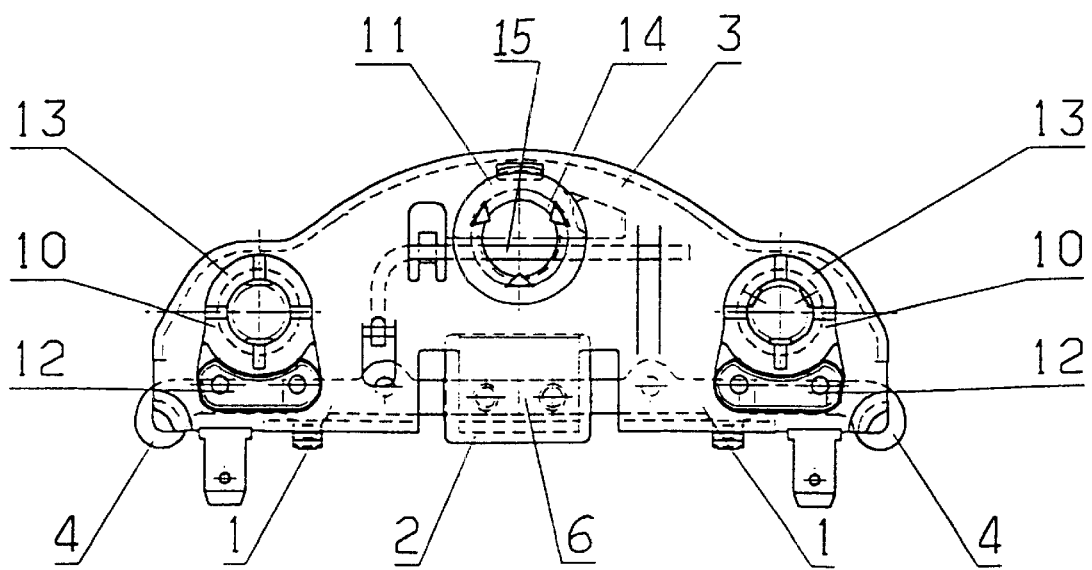
FIG. 2 shows a top view onto the components according to FIG. 1, the airbag module being replaced for better illustration.

From FIG. 2, the components of the sectional illustration of FIG. 1 can be seen in top view. In the support plate 3, the marginal section for the arrangement of the electrically insulating element 2 for fastening the central part 6 of the spring plate 1 is cut out laterally, in order to be able to form in addition to the bores in the support plate 3 connections on the marginal side between the upper part and the lower part of the injection-molded plastic part 2. The contact arms 4 extend laterally up to the marginal region of the support plate 3. Two bores 13 are provided for the insertion of the screws 7 and are lined with a bush 10 in the form of an injection-molded plastic part. On each of the bushes 10 for the screws 7 there is integrally formed, with an offset, a support or spacer 12 for the airbag module.. The support plate 3 has in addition a bore 14 for the fastening of the airbag module, which bore is lined with a bush 11 in the form of an injection-molded plastic part. In this case, the fastening of the airbag module on the support plate 3 is constructed as a snap-in connection, for which a latching spring 15, acting parallel to the steering wheel plane, is fastened to the support plate 3.

Figure 4:
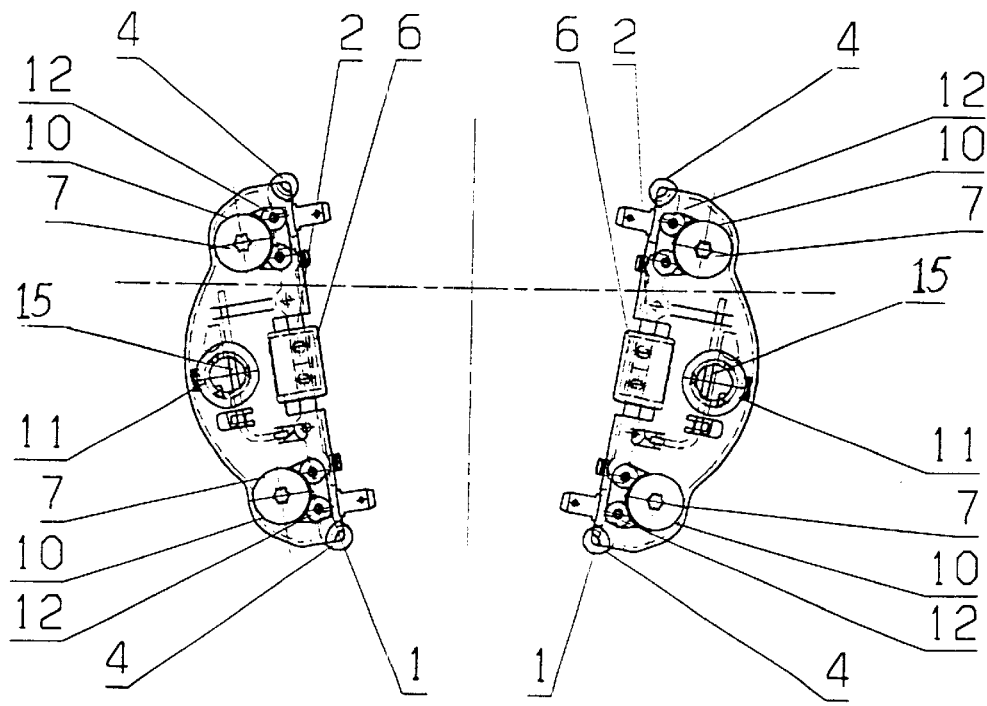
FIG. 4 shows an embodiment with two support plates according to FIG. 2.

It can be seen from FIG. 4 how two parts according to FIG. 2 can be arranged relative to the central point of the steering wheel, which is indicated by intersecting lines. A more detailed explanation is not necessary.

Figure 3:
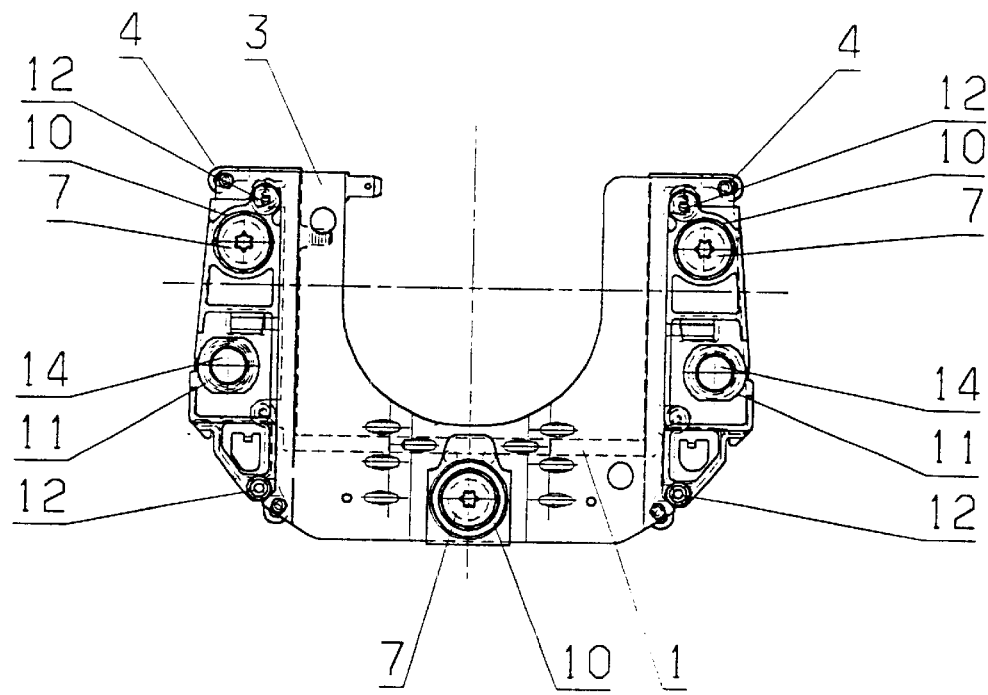
FIG. 3 shows an embodiment with U-shaped support plate.

FIG. 3 shows the construction of a U-shaped support plate 3, which is connected with the steering wheel body by means of three screws 7 having a shaft. In this case, the spring plate 1 is also constructed so as to be substantially U-shaped and with in total four contact arms 4 projecting outwards. Two fastening points 11, 14 are provided for the airbag module. The bushes 10 for the screws 7 and the spacers 12, formed on in one piece, are again constructed as an injection-molded plastic part and are formed in a similar manner to those in FIGS. 1, 2 and 4. The embodiment according to FIG. 3 manages with three fastening points between the support plate 3 and the steering wheel body, but occupies with the base of the U-shaped support plate 3 a certain structural space, which is possibly required for other purposes. One must then have recourse to the embodiment with two support plates 3 arranged symmetrically to each other, and with a total of four fastening points.

The idea of the invention is of course not limited to the illustrated embodiments. It is merely determinative that both contacts are constructed or fastened on the support plate for the airbag module which is arranged so as to be movable relative to the steering wheel, so that the necessary exact maintaining of the contact gap can be realized by simple means on one and the same component. In the steering wheel itself, only a corresponding number of supports is to be provided, the determinative arrangement of which relative to the installation plane for the airbag module can be provided with relative broad tolerances, because in this respect the concern is not with the contact gap but rather with the movement play for the actuation of the horn contact.

What is claimed is:

1. A steering wheel, for use in motor vehicles, said steering wheel comprising:

a steering wheel plane, an airbag module, a support plate, a spring plate connected to said support plate via an electrically insulating element and being located between said support plate and said steering wheel, an insulating support fixed to said steering wheel and spaced apart from said insulating element, and restoring springs for replacing said airbag module in an initial position after displacement for actuation of a horn contact, said airbag module, for actuation of said horn contact, being constructed so as to be displaceable together with said support plate approximately perpendicularly to said steering wheel plane against said restoring springs by at least a contact gap, and being connected with said support plate extending substantially parallel to said steering wheel plane, said support plate being connected electrically to said vehicle, forming a ground electrical contact and cooperating with said spring plate defining a counter-contact arranged so as to be electrically insulated with respect to said vehicle, said spring plate being aligned substantially parallel to said steering wheel plane and having at least one contact arm which bends elastically approximately perpendicularly to said support plate and is able to be supported on a rear face on said insulating support, said insulating element and said insulating support being displaced relative to each other by displacement of said airbag module for actuation of said horn contact.

2. The steering wheel according to claim 1, wherein said support plate is constructed in a U-shape and has two legs and wherein to each of said two legs of said support plate an associated spring plate is fastened.

3. The steering wheel according to claim 1, wherein said support plate consists of two identical parts which are arranged in said steering wheel so as to be mirror-inverted to each other, one spring plate each being fastened to said identical parts.

4. The steering wheel according to claim 2, wherein said spring plate is constructed in a stripe shape and has a central part and two contact arms extending from said central part in opposite directions, said central part being fastened to said legs of said support plate, and said contact arms having ends able to be supported on said insulating support fixed to said steering wheel.

5. The steering wheel according to claim 3, wherein said spring plate is constructed in a stripe shape and has a central part and two contact arms extending from said central part in opposite directions, said central part being fastened to said parts of said support plate, and said contact arms having ends able to be supported on said insulating support fixed to said steering wheel.

6. The steering wheel according to claim 1, wherein said electrically insulating element consists of an injection-molded plastic part.

7. The steering wheel according to claim 1, wherein screws having a shaft are provided, said support plate being connected with said steering wheel by means of said at least two screws and wherein for each screw one of said restoring springs is mounted between said support plate and said steering wheel.

8. The steering wheel according to claim 7, wherein in said support plate recesses are provided which are lined with a bush in a form of an injection-molded plastic part and are provided for inserting said screws.

9. The steering wheel according to claim 8, wherein in said support plate at least two recesses are provided which are lined with a bush in the form of an injection-molded plastic part and are provided for fastening said airbag module.

10. The steering wheel according to claim 9, wherein a support means is provided for said airbag module, one support means each being integrally formed with a lateral offset on said bushes for said screws.

11. The steering wheel according to claim 10, wherein said bushes for fastening said module are constructed on an upper side as said support means for said airbag module and on an underside as means for limiting a clearance to said steering wheel.

12. The steering wheel according to claim 1, wherein all injection-molded plastic parts are formed in a single injection process on said support plate and on said spring plate which are inserted in correct position into a corresponding mold.

13. The steering wheel according to claim 1, wherein a fastening of said airbag module on said support plate is constructed as a snap-in connection and wherein for said fastening on said support plate a latching spring is fastened which acts parallel to said steering wheel plane.

14. An apparatus comprising:

a steering wheel having a steering wheel plane, an airbag module, a support plate connected with said airbag module and extending substantially parallel to said steering wheel plane, a spring plate connected to said support plate by an electrically insulating element and being located between said support plate and said steering wheel, an insulating support fixed to said steering wheel and spaced apart from said insulating element, and restoring springs for replacing said airbag module to an initial position after displacement of said airbag module from the initial position for actuation of a horn, said airbag module and said support plate, for actuation of said horn, being displaceable together as a unit approximately perpendicularly to said steering wheel plane against said restoring springs, said support plate being connected electrically to said vehicle and forming a ground electrical contact, said spring plate arranged to be electrically insulated from said ground electrical contact, said spring plate being substantially parallel to said steering wheel plane and having at least one electrical contact arm which bends elastically approximately perpendicularly to said support plate into engagement with said support plate during displacement of said airbag module and said support plate, said electrical contact arm having a rear face engaging said insulating support prior to being deflected, said insulating element and said insulating support being displaced relative to each other by displacement of said airbag module for actuation of said horn contact.

* * * * *